United States Patent [19]

Kohnhauser

[11] Patent Number: 4,471,899
[45] Date of Patent: Sep. 18, 1984

[54] METHOD FOR FABRICATING HOLLOW CYLINDERS OF MACHINES

[75] Inventor: Alexander Kohnhauser, Kapfenberg, Austria

[73] Assignee: Vereinigte Edelstahlwerke (VEW), Vienna, Austria

[21] Appl. No.: 394,924

[22] PCT Filed: Oct. 19, 1981

[86] PCT No.: PCT/AT81/00026
  § 371 Date: Jun. 24, 1982
  § 102(e) Date: Jun. 24, 1982

[87] PCT Pub. No.: WO82/01493
  PCT Pub. Date: May 13, 1982

[30] Foreign Application Priority Data

Nov. 6, 1980 [AT] Austria .................... 5443/80

[51] Int. Cl.³ .................... B23K 20/04; B23K 31/06
[52] U.S. Cl. .................... 228/161; 228/186; 228/231; 228/265
[58] Field of Search .......... 228/161, 186, 265, 156, 228/158, 231

[56] References Cited

U.S. PATENT DOCUMENTS

| 316,865 | 4/1885 | Ball .................... 228/161 |
| 1,392,416 | 10/1921 | Henderson .................... 228/186 X |
| 2,258,563 | 10/1941 | Armstrong et al. .................... 228/161 X |
| 3,038,251 | 6/1962 | Mohnkern et al. .................... 228/161 |
| 4,162,758 | 7/1979 | Mikarai .................... 228/158 |
| 4,367,838 | 1/1983 | Yoshida .................... 228/158 X |

FOREIGN PATENT DOCUMENTS

| 1627789 | 2/1971 | Fed. Rep. of Germany . |
| 1627788 | 3/1971 | Fed. Rep. of Germany . |
| 2611225 | 10/1976 | Fed. Rep. of Germany . |
| 2359655 | 2/1978 | France . |

Primary Examiner—Kenneth J. Ramsey
Attorney, Agent, or Firm—Werner W. Kleeman

[57] ABSTRACT

The invention is concerned with the object of providing an advantageous manufacturing method for a machine hollow cylinder subjected to high working pressure and pronounced erosion action, especially those used for plastic processing machines. To that end a preferably cylindrical-shaped blank composed of a high-wear resistant, hardenable and corrosion-resistant steel core and a sleeve formed of structural steel, is shaped by forging or hot rolling while forming a metallic bond between core and sleeve and a reduction in the cross-sectional area of the core material by at least 20%. Then by applying a bore while taking into account the machining clearance there is formed the hollow cylinder, there is accomplished the hardening which is accommodated to the core material, and there is undertaken the machining for obtaining the desired final dimension.

6 Claims, 4 Drawing Figures

METHOD FOR FABRICATING HOLLOW CYLINDERS OF MACHINES

BACKGROUND OF THE INVENTION

The invention relates to a new and improved method of fabricating hollow cylinders of machines which are subjected to a high working pressure and pronounced erosion effects. Such machine parts are subjected to extremely great wear by virtue of resulting internal pressures in the order of magnitude of 1,000 to 2,000 bar, the frequently high corrosion loads, and last but not least by virtue of the fillers used in processing plastics. It has been found that certain fillers such as, for instance, glass fibers can reduce the service life of such parts to as much as 1/10 of the original value. Since in injection molding machines approximately 0.25 mm constitutes the maximum permissible clearance between worm and cylinder, the significance of the wear factor can be appreciated and, accordingly, on the part of the machine manufacturer considerable efforts have already been made to solve this technological problem.

The solution presently most employed is the use of nitrided steels, which render possible the application of a wear-inhibiting nitrided layer to the inner cylinder surface by means of the methods used therefor (bath nitriding, gas nitriding, ion nitriding). However, there results the drawback that during the treatment a pronounced distortion or, respectively, a change in dimensions frequently occurs and the thin nitrided layer is non-uniformly taken off already during the mechanical finishing of the cylinder. Since the cylinder material has relatively low strength, the wear following the machining of such weak locations progresses extremely rapidly. For the same reason the use of case hardened layers, also, has not been sufficiently satisfactory. Attempts have also already been made to provide hot-work steels with hard surface layers, for instance by treating with boron, flame spraying or by means of the so-called CVD-methods (chemical vapor-phase deposition). Therein, however, problems have occurred with respect to dimensional changes due to the required high coating temperatures and to chipping-off of the hard layers during operation.

An interesting although expensive solution is represented by the manufacture of so-called "bimetallic cylinders". These are understood to be primarily used for machines having larger worm diameters. Specially developed coating alloys are applied to a pre-fabricated part thereof to form an approximately 1.5 to 4 mm thick layer thereon in a hermetically sealed furnace at high rotational speeds needed until cooling (see, for example "Industrieanzeiger" Nr. 60, dated July 20, 1973, pages 1403/4). The respective centrifugal casting, however, it not easy to control; also, the brittleness of the bimetallic layers can lead to problems.

SUMMARY OF THE INVENTION

Therefore, with the foregoing in nind, it is a primary object of the present invention to provide a new and improved method of economically manufacturing hollow cylinders of machines which optimumly fulfil the requirements placed thereon.

Now in order to implement these and still further objects of the invention, which will become more readily apparent as the description proceeds, the method of the present development is manifested by the features that, a blank composed of a highly wear-resistant, hardenable and corrosion-resistant steel core and a sleeve formed of structural steel is shaped by forging or hot rolling, whereby a metallic bond is formed between the core and the sleeve and the cross-sectional area of the core is reduced by at least 20%. The hollow cylinder is, then, formed by boring out part of the core while taking into account the machining tolerance, then the hollow cylinder is subsequently hardened with respect to the core, i.e. predicated upon the desired hardening of the core, and machined so as to assume the desired final dimensions.

In a preferred embodiment of the method according to the invention the blank is formed by a structural steel tube and a rod formed by the core material snugly fitted therein, the blank is metallically sealed at both ends either directly by applying a welding seam in the region thereof or indirectly by welding a disk thereto covering the same, and then shaped by forging or hot rolling with a reduction in the cross-sectional area of the core material by at least 40%.

As the material for the core there can be basically used all forgeable alloys which fulfil the requirements placed thereupon.

It is particularly preferred, however, to use as the core material a forgeable steel alloy selected from the group of the ledeburite chromium steels containing at least 11% Cr or the stainless hardenable chromium steels containing at least 14% Cr.

It should be readily understood that thereunder there also are to be understood modifications of these aforementioned alloy types formed by the addition of one or a number of further alloying elements, wherein there should be mentioned as the additive elements for the ledeburite Cr-steels especially Mo, V, W and Co up to a total of approximately 12% and for the stainless Cr-steels especially Mo, Ni, V, W, Co, Ti, Nb up to a total of approximately 6%.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
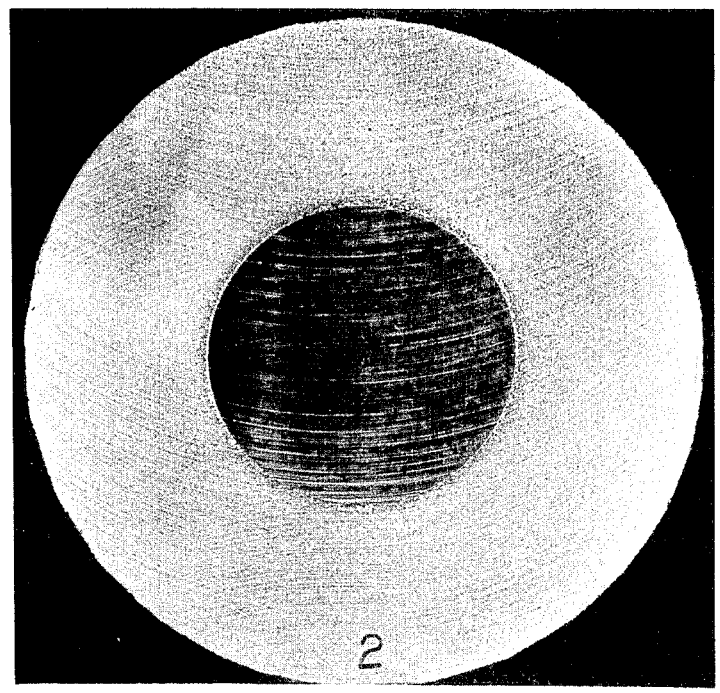
FIG. 1 shows the copy of a photograph of a hot etched disk of a disk sample removed transversely relative to the axial direction approximately in the region of the first third of the length of a sample body obtained after forging and subsequent soft-annealing in the method according to the invention.
Figure 2:
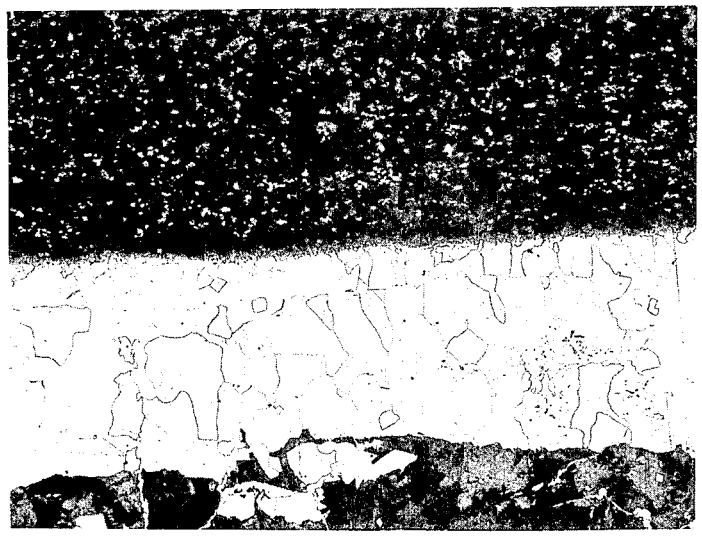
FIG. 2 is the copy of a microphotograph showing the microstructure (100:1) of the boundary region between the core and the marginal material in a disk sample cut similarly to the one shown in FIG. 1.
Figure 3:
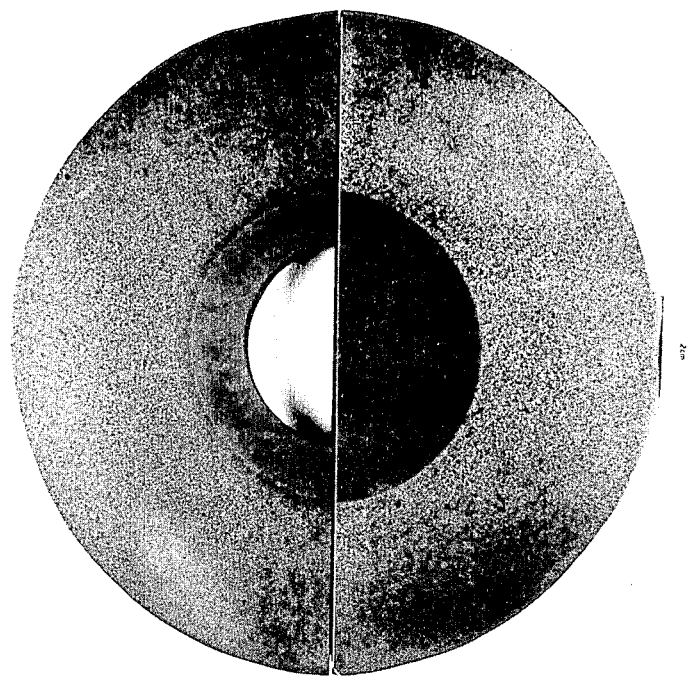
FIG. 3 is a copy of photograph showing the macrostructure of a further sample taken at a different location from a sample body obtained in the method according to the invention, part thereof provided with the desired bore in the core and subjected to the corresponding thermal treatment (hardened and tempered)
Figure 4:
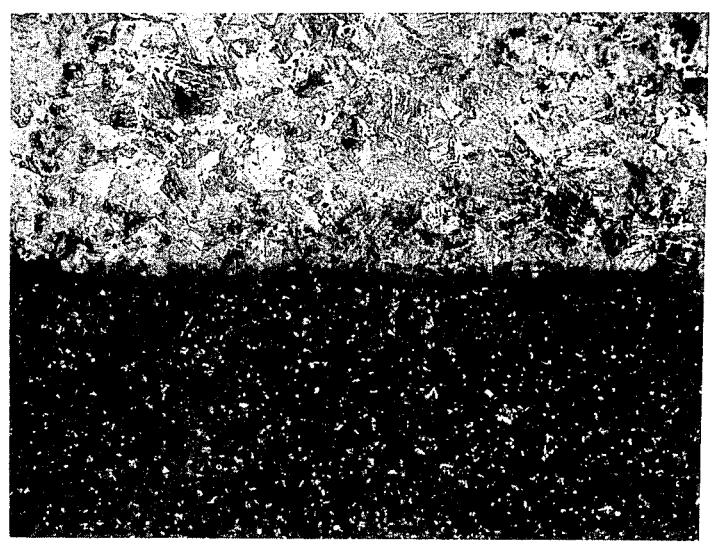
FIG. 4 is a copy of a microphotograph showing the microstructure (100:1) in the boundary region between the core and the marginal material of the sample as shown in FIG. 3.

The method according to the invention will not be described more fully and explained by exemplary embodiments.

EXAMPLE 1

A machine hollow cylinder for plastic processing was fabricated in that a cylindrical core material formed of the ledeburite Cr-steel of the material Nr. 1.2379 (X 155 Cr V Mo 121) was snugly sealingly pressed into a structural steel tube of the material Nr. 1.7131 (16 Mn Cr 5) and both ends of the blank possessing an outer diameter of 170 mm (with a core diameter of 75 mm) and a length of 500 mm were closed with respect to the atmosphere by circularly welding a respective round plate at the region of the marginal material. This blank was then brought to the forging temperature (1150° C.) and shaped upon a longitudinal forging machine from the forging heat to approximately twice the length, whereby there resulted an outer diameter of the workpiece of 110 mm and a core diameter of 52 mm. Due to this forging work there was obtained a completely faultless metallic bond of the core and marginal material over the entire circumference, something recognized from the micrographs, which were obtained by the disk-like sectioning of a similar type of analogously fabricated body.

(Similar results were obtained for all disk samples removed over the entire length of the sample body.)

After the soft-annealing and straightening of the workpiece there was formed a central bore of 34 mm (±0.3 mm) and there was undertaken a thermal treatment for obtaining a hardness and strength of the core material of 59–61 HRc and the marginal material of 920 N/mm².

The machine hollow cylinder which was finished fabricated in conventional manner (grinding and honing, respectively, to the final dimension) when used procuced a more than threefold service life in comparison to such a cylinder fabricated of nitrided steel, and moreover following the boring operation to an inner width suitable for accommodating a worm of somewhat larger diameter could be further used as a new machine part.

EXAMPLE 2

At the center of a slightly conically constructed casting mold there was inserted a core, formed in accordance with the taper and the wall shape, respectively, composed of stainless chromium steel of the material no. 1.4528 (X 105 Cr Co Mo 182) and fixed with the base plate. Moreover, at the upper end surface of the core material there was placed a weight, in order to ensure for a positive positional retention of the core during the casting. In the ascending casting this core was cast with a uniform layer formed of a structural steel melt composed of the steel material no. 1.7218 (25 Cr Mo 4). The composite steel block formed in this manner was brought in a still hot condition to the rolling mill and there was fabricated by hot rolling a blank, the uniform metallic bond of which was checked and verified.

From the blank there was produced in the manner described already in conjunction with Example 1 a machine hollow cylinder which in use during plastic processing likewise proved itself to be outstanding.

While there are shown and described present preferred embodiments of the invention, it is to be distinctly understood that the invention is not limited thereto, but may be otherwise variously embodied and practiced within the scope of the following claims.

Accordingly, what I claim is:

1. A method of manufacturing hollow machine cylinders subjected to high operating pressures and pronounced erosion effects, comprising the steps of:

shaping by forging or hot rolling a blank composed of a core made of a substantially cylindrical high wear-resistant, hardenable and corrosion resistant steel core material and a substantially cylindrical sleeve made of structural steel, so as to produce a metallic bond between said core and said sleeve while reducing the cross-sectional area of said core material by at least 20%;

forming a bore in said blank;

hardening said bored blank predicated upon a desired hardening of said core material; and machining said bored blank including said hardened core material so as to obtain said hollow cylinder having desired final dimensions.

2. The method as defined in claim 1, further including the steps of:

snugly fitting a rod made of said core material and defining said core into a structural steel tube defining said sleeve while forming a joint therebetween;

metallically sealing the joint between said rod and said steel tube at end regions thereof by applying a welding seam thereto to obtain said blank; and reducing by said forging or hot rolling the cross-sectional area of said core by at least 40%.

3. The method as defined in claim 1, further including the steps of:

snugly fitting a rod made of said core material and defining said core into a structural steel tube defining said sleeve while forming a joint therebetween;

metallically sealing the joint between said rod and said steel tube at end regions thereof by welding a disc thereto which covers said end regions to obtain said blank; and reducing by said forging or hot rolling the cross-sectional area of said core by at least 40%.

4. The method as defined in claim 1, further including the steps of:

using a forgeable steel alloy as the core material; and selecting said forgeable steel alloy from the group consisting of ledeburite chromium steels containing at least 11% chromium.

5. The method as defined in claim 1, further including the steps of:

using a forgeable steel alloy as the core material; and selecting said forgeable steel alloy from the group consisting of stainless hardenable chromium steels containing at least 14% of chromium.

6. The method as defined in claim 1, further including the step of:

while forming said bore in said blank providing sufficient allowance for the following machining operation.

* * * * *

UNITED STATES PATENT AND TRADEMARK OFFICE
CERTIFICATE OF CORRECTION

PATENT NO. : 4,471,899

DATED : September 18, 1984

INVENTOR(S) : Alexander KOHNHAUSER

It is certified that error appears in the above—identified patent and that said Letters Patent is hereby corrected as shown below:

Column 1, line 59, please delete "nind" and insert --mind--

Column 3, line 42, please delete "procuced" and insert --produced--

Signed and Sealed this

Twelfth Day of March 1985

[SEAL]

Attest:

DONALD J. QUIGG

Attesting Officer

Acting Commissioner of Patents and Trademarks